W. J. BURRIDGE.
FLOOR CRAMP.
APPLICATION FILED SEPT. 25, 1914.
1,186,277.
Patented June 6, 1916.
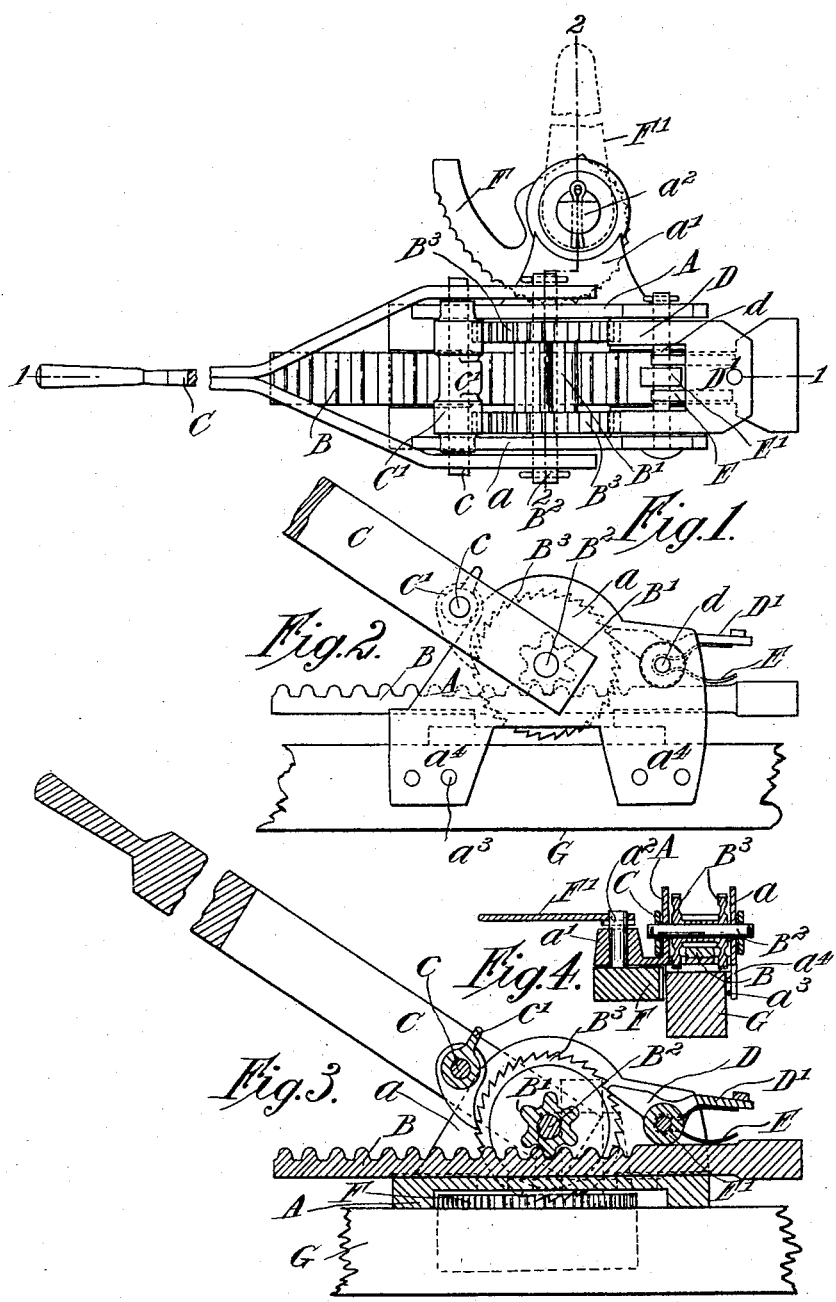
WITNESSES;
John C. Sanders
Albert F. Henman
INVENTOR:
Walter John Burridge
BY M. Wallace White
ATT'Y.

UNITED STATES PATENT OFFICE.

WALTER JOHN BURRIDGE, OF ST. KILDA, VICTORIA, AUSTRALIA.

FLOOR-CRAMP.

1,186,277.  Specification of Letters Patent.  Patented June 6, 1916.

Application filed September 25, 1914. Serial No. 863,423.

*To all whom it may concern:*

Be it known that I, WALTER JOHN BURRIDGE, of Teignmouth, Hotham street, St. Kilda, in the State of Victoria, Commonwealth of Australia, a British subject, have invented new and useful Improvements in Floor-Cramps, of which the following is a specification.

This invention relates to floor cramps for forcing the joints of floor boards close together, prior to the boards being nailed, of the kind adapted to be gripped to a joist by means of a serrated cam-shaped gripping member while the board is forced into position by a rack bar operated by a pin, a pair of ratchet wheels of greater diameter than said pinion and a pair of pawls is carried by an operating lever and adapted to said ratchet wheels.

The objects of the present invention are to provide improved retention means for the rack bar and to provide a compact form of cramp.

To these ends and in accordance with this invention a pawl is pivotally mounted on the carrying bracket of the cramp close to and adapted to engage the ratchet wheels.

The improved cramp consists of a metal bracket piece having at one side downwardly projecting grip lugs and at the other side a projecting lug which takes the vertical journal pin of a metal serrated cam grip. The said bracket piece has also upwardly projecting side cheeks between which is a longitudinal race to receive a toothed metal rack bar and its pinion, the latter being secured on a cross spindle which is supported in bearings in said side cheeks, while formed integral with and on either side of said rack pinion are two larger ratchet wheels which are capable of being operated by a double pawl forked hand lever which is also centered on the aforesaid cross spindle outside of the bearing cheeks. The said toothed rack bar has a pressure head at one end, and above and fitting over it, between the aforesaid side cheeks, is a pivoted retention pawl which is acted on by suitable springs or by a spring to retain the toothed rack bar at the position it has been placed by the forked hand lever acting on the ratchet wheels and the attached ratchet portion.

This invention will now be fully described aided by a reference to the attached sheet of drawings in which:—

Figure 1 is a plan and Fig. 2 a side view of my improved floor cramp. Fig. 3 a central longitudinal section on line 1—1 Fig. 1 and Fig. 4 a transverse section on lines 2—2 also of Fig. 1 but drawn to a smaller scale.

In said figures A is the bracket piece, B the sliding toothed rack bar, $B^1$ the toothed pinion gearing therewith and centered on spindle $B^2$ carried in bearings in side cheeks $a$ of said bracket piece, $B^3$ are the ratchet wheels formed integral with the toothed pinion $B^1$ and hence also arranged upon spindle $B^2$.

C is the hand lever having its lower forked end centered upon spindle $B^2$ outside of aforesaid side cheeks $a$ and said lever carries a double pawl $C^1$ centered on spindle $c$ carried in the forked part of hand lever C, the pawl $C^1$ being furnished with a thumb piece $c^1$ by which it may be released from the ratchets $B^3$.

D is a double toothed retention pawl also designed to engage with ratchet wheels $B^3$ it being centered on a pin $d$ furnished with bearings in the side cheeks $a$ of bracket piece. The pawl D has a backwardly projecting integral presser or foot piece $D^1$ which is seated on springs E while $E^1$ is a central roller to work on the upper face of the rack bar B.

At one side of bracket piece is a bossed lug $a^1$ furnished with a hole to receive a vertical journal pin $a^2$ the upper end of which is fitted with a key or short lever $F^1$ while upon or formed integral with the pin $a^2$ below the bracket piece is a cam grip piece F which is designed to grip one side of the flooring joist G the other side of which is gripped by the pins or serrations $a^3$ on the inner face of the lower grip lugs $a^4$.

It is by working the key or lever $F^1$ that the cam grip F is first pressed against or released from the joist which lies between it and the aforesaid pinned or serrated cheek lugs while the floor boards are forced into position by means of the sliding rack bar B being operated by the pinion $B^1$ whose integral ratchet wheels are rotated by the pawl lever C, the rack bar being held at the required position to maintain the strain by the spring retention pawl D.

Having now described my invention what I claim as new and desire to secure by Letters Patent is:—

1. An improved floor cramp consisting of a metal bracket piece having at one side downwardly projecting grip lugs and at the other side a projecting lug having a vertical boss, a pin journaled in said boss, a gripping member journaled on said pin, said bracket member being also formed with upwardly projecting side cheeks providing a longitudinal race, a rack bar movable in said race between the side cheeks, a cross spindle journaled in the side cheeks, a pinion fixed thereto, ratchet wheels of larger diameter formed integral with said pinion on either side thereof, a lever straddling the side cheeks and pivoted to said pin, pawls carried by the lever and side cheeks respectively to engage the ratchet wheels at diametrically opposite points, one of said pawls being spring-pressed and adapted to be depressed for disengaging the same, and said pawls preventing movement of the lever in opposite directions, and a roller journaled between the side cheeks of the bracket piece and bearing on the rack bar, said roller and pinion constituting a two-point pressure means to guide the rack bar during its movement.

2. In an improved floor cramp the combination of a ratchet lever furnished with double pawls, two ratchet wheels formed integral with a central toothed pinion of much smaller diameter than said ratchet wheels, a toothed sliding rack bar, with which said toothed pinion gears, a bracket piece carrying a spindle for said ratchet lever and toothed gears, a spring retention pawl, and a roller journaled on the support of the retention pawl for movement over the rack bar substantially as described and shown.

In testimony whereof I have signed my name to this specification in the presence of two subscribing witnesses.

WALTER JOHN BURRIDGE.

Witnesses:
  MEDLINGTON HODGCOMB,
  LESLIE LAWTON BEAR.

Copies of this patent may be obtained for five cents each, by addressing the "Commissioner of Patents, Washington, D. C."